June 22, 1926.
W. F. ALBRECHT
1,590,068
FAUCET VALVE KEY
Filed Nov. 20, 1925
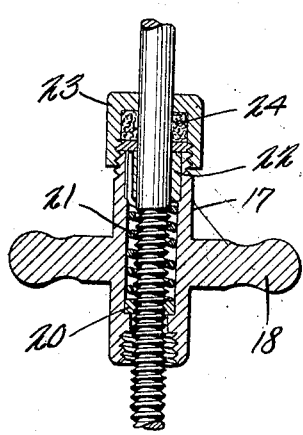
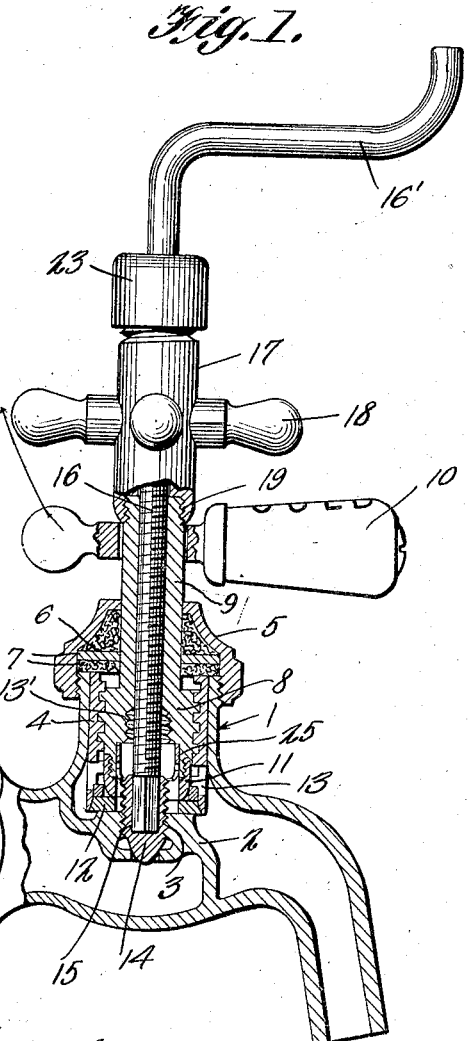
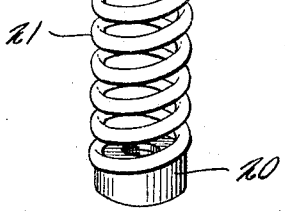
W. F. Albrecht,
INVENTOR Patented June 22, 1926.

1,590,068

UNITED STATES PATENT OFFICE.

WILLIAM F. ALBRECHT, OF SALT LAKE CITY, UTAH.

FAUCET-VALVE KEY.

Application filed November 20, 1925. Serial No. 70,395.

This invention relates to a faucet, the general object of the invention being to provide means for closing the passageway in the faucet so that the working parts of the faucet can be removed without water escaping from the faucet even though the main valve of the water system has not been turned off, with a key for moving such means to operative and inoperative positions.

The faucet of the present invention is shown and described in an application filed concurrent herewith.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings, wherein like characters denote like or corresponding parts throughout the several views, and in which:—

Figure 1 is a longitudinal sectional view of a faucet with the key in position.

Figure 2 is a sectional view through the key.

Figure 3 is a view of the interior parts of the key.

In these views, 1 indicates the body of the faucet which is provided with the partition 2 having the threaded opening 3 therein through which the water passes to reach the outer part of the faucet from the inner part. A barrel 4 is removably arranged in the cylindrical extension of the body and is held in place by the cap 5 which is provided with the packing 6 and the washers 7. This barrel 4 is internally threaded to receive the valve head 8, the hollow stem 9 of which passes through the cap and is provided with the handle 10, so that the head 8 can be rotated in the barrel. A ring-shaped member 11 is screw threaded to the lower end of the head 8 and engages a washer 12 which is carried by the lower end of the barrel. When the head is in lowered position, the member 11 will close the openings 13 formed in the barrel and thus shut off the flow of water. As will be seen, the washer 12 is arranged between the partition 2 and the barrel 4 and acts as a gasket to prevent leakage between these parts and it also is engaged by the member 11, when the valve is closed, to prevent the flow of water through the faucet. Thus this washer serves a double function.

The head is provided with a threaded opening 13' which is in communication with the bore of the stem and a threaded plug 14 is normally seated in said opening. The plug is provided with a socket 15 for receiving the square end of a threaded shaft or key 16 which is passed through the stem 9, so that the plug can be rotated out of the opening 13' and into the threaded port 3 to close said port.

A spring sleeve 25, having its lower end tapered and split, is carried by the head 8 and acts to support the plug 14 as it passes from the threaded part of the head 8 into the threaded part of the partition 2, these parts being so formed that the plug will have left one threaded part before engaging with the other threaded part. This arrangement prevents damage to the threads or "cross threading".

When the plug is in its lowered position in the port 3, the working parts of the valve can be removed for inspection and repair and replacement of the washer 12. The shaft 16 passes through a body 17 which is provided with the handles 18 and which has a threaded interior part 19 at its lower end for engaging the threaded upper end of the stem 9, as shown in Figure 1, so that the body is attached to the stem. These threads on the stem normally receive a small cap for holding the handle in place, as shown in the above mentioned application. A nut 20 is arranged in the body 17 and engages the threaded part of the shaft 16, and said nut is connected by a spring 21 with a bushing 22 through which the shaft passes and which is arranged in the upper part of the body. The parts are held in the body by the cap 23 which contains the packing 24.

From the foregoing, it will be seen that the faucet is opened and closed by rotating the valve head 18 in the barrel by means of the handle 10 so as to move the member 11 to cover and uncover the openings 13, and when the working parts are to be removed for any reason, the water must be shut off, and instead of closing the valve of the water system it is simply necessary to move the plug 14 into the port in partition 2 to close the same and thus prevent the escape of water while the faucet is being repaired. To adjust the plug, the cap which holds the handle 10 on the stem 9 is first removed and then the shaft 16 is passed through the stem 9 and its square end inserted in the socket 15 of the plug 14. Then the body 17 is screwed on to the stem 9. The shaft 16 is then rotated by means of its handle 16' to revolve the plug so that the plug will pass from the head 8 into the port of the recess 2, being supported by the sleeve 25 midway between the parts. The spring 21 yieldingly supports the nut 20 and thus permits the plug to adjust itself to the threads of the part which it is entering without danger of injuring the threads. After the plug is fully inserted into the partition, the parts can be separated to repair the working parts of the valve without danger of water leaking from the faucet. After the parts are replaced, the key member is used in the same manner to return the plug to its original position in the head 8 so that water will flow from the faucet when said head is raised.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with a faucet having a plug in its valve head and a threaded port for receiving the plug in its partition, a shaft having a part for engaging the plug to move it from the head into the port and vice versa, a body through which the shaft passes, means for detachably connecting the body with the valve stem and a nut member in the body through which the shaft passes.

2. In combination with a faucet having a plug in its valve head and a threaded port for receiving the plug in its partition, a shaft having a part for engaging the plug to move it from the head into the port and vice versa, a body through which the shaft passes, means for detachably connecting the body with the value stem, a nut member in the body through which the shaft passes, and yieldable means in the body for holding the nut in its lowest position.

3. In combination with a faucet having a plug in its valve head and a threaded port for receiving the plug in its partition, a shaft having a part for engaging the plug to move it from the head into the port and vice versa, a body through which the shaft passes, the lower end of the body being threaded to engage the threaded upper end of the valve stem, a cap at the upper end of the body, a nut in the body engaging the threaded part of the shaft, a bushing in the body through which the shaft passes, a coiled spring connecting the nut with the bushing, a handle on the body and a handle on the upper end of the shaft.

4. In combination with a faucet having a plug in its valve head and a threaded port in its partition for receiving the plug, a guiding sleeve on the head for guiding the plug in its passage from the head to the port and vice versa and a key for moving the plug.

In testimony whereof I affix my signature.

WILLIAM F. ALBRECHT.